Patented Apr. 27, 1943

2,317,421

UNITED STATES PATENT OFFICE 2,317,421

WELDING ROD

Nils K. G. Tholand, New York, N. Y.

No Drawing. Application February 27, 1941,
Serial No. 380,767

8 Claims. (Cl. 219—8)

My invention relates to an improved welding rod, and more particularly to a rod of this nature for welding stainless steel.

As is well known, stainless iron and steel alloys consist of alloys of chromium, iron and carbon with or without the addition of other constituents such as nickel, vanadium, molybdenum, and others. One particular stainless steel for example which is very generally employed because of its excellent resistance to corrosion consists essentially of 74% iron, 18% chromium, 8% nickel and from about 0.08 to 0.20% carbon. Heretofore, welding rods for welding stainless steel have themselves been made of the same alloy as the material to be welded. However, such welding rods present welding difficulties when used with alternating current transformer type welding equipment, which limit their employment and detract from the efficiency and soundness of the weld which is produced.

In accordance with my invention I provide a welding rod which consists of a core of iron or steel coated with a metallic powder, or powders, or an alloy in powdered form. This metallic powder may consist, for example, of chromium or of an alloy of chromium and nickel with or without other small additions of metallics. The ultimate composition of the rod and its metal powder coating is such as to conform essentially to the composition of the material which is being welded. This coating of powder is applied to the core by means of a binder which may consist of an inert material, such as shellac, or it may consist of a suitable flux. A welding rod of this nature may be used with either a D. C. or an A. C. welder and in either case results in an improved weld.

In the case of the above example, while the nickel-chromium powder may be made in any manner, such as shotting, attrition or reduction by ordinary means, I prefer to employ as a coating a nickel-chromium alloy in powdered form produced by the well known hydride process. It is believed that nickel-chromium alloy made in this manner contains adsorbed hydrogen, and it is my opinion that this hydrogen is released during the welding process and acts as a protective atmosphere and as a reducing agent.

I have also discovered that improved results are obtained if, to the alloy which is used in powdered form, is added small percentages of a powdered metal hydride, such as titanium hydride.

Further objects and advantages of my invention will be apparent from the following description:

In accordance with my invention, a welding rod may be prepared for welding stainless steel of the 18 chromium, 8 nickel variety referred to above by way of example, by utilizing an iron core which is coated with an alloy in powdered form consistsing of 70% chromium and 30% nickel by weight. This alloy is preferably made by the well known hydride process. Briefly, this process consists in mixing purified oxides of chromium and nickel in the correct proportions to give a final alloy of 70% chromium and 30% nickel. A metallic hydride, usually calcium hydride is then added to the mixture, which is then heated in a furnace. As a result of this heating there is formed calcium oxide, nascent hydrogen, chromium-nickel alloy and water, and it is believed that certain quantities of the nascent hydrogen are adsorbed in the alloy. The calcium oxide is then leached out, leaving the chromium-nickel alloy in powdered form.

The powdered alloy thus obtained may be applied to the iron core by mixing it with a binder such as a solution of shellac in denatured alcohol. The amount of powdered alloy added to the binder should in this instance equal approximately 26% by weight of the powder per unit weight of the coated core. The core may be rolled in the mixture of powdered alloy and shellac and then dried in air for a sufficient period of time to permit the evaporation of the alcohol. After this has been done the coated core may be given an additional coating of a suitable flux, as for example a mixture of calcium fluoride, potassium chromate, and sodium silicate suspended in water. This coating may be applied by dipping, followed by a period of air drying, and then by drying at a temperature of 100° F.

The above mentioned proportion of 26% nickel-chromium powder is such as to give a percentage of 18% chromium, 8% nickel, and 74% iron in the finished weld, which is the same proportion as these metals occur in this example of stainless steel.

As above stated, a welding rod of this nature may be used with either an A. C. or a D. C. welder. Examination and tests of the finished weld reveals that it is of substantially the same consistency as the stainless steel welded. The weld is non-magnetic, which is a characteristic of this stainless steel and it does not precipitate copper on the application of the standard copper sulphate test for stainless steel.

If desired, the powder used as a coating may in addition contain about 2% of a metallic hydride, such as titanium hydride. A test of a welding rod so coated indicates that the hydrogen is liberated in nascent form from the hydride during the welding process and assists in preventing oxidation.

If desired, instead of an inert binder such as shellac, other materials may be used for this purpose. As such a material I have employed an 8% sodium silicate solution. The proper percentage of powdered chromium-nickel alloy was added to such a solution and the iron core dipped therein and thereafter the moisture content removed by baking at about 200° F. until dry. The rod was then given two additional coatings of flux. The first consisted of an aqueous suspension of calcium fluoride, potassium chromate, ferro-manganese, ferro-silicon and sodium silicate in which the rod was dipped and then dried at approximately 200° F. The second consisted of an aqueous suspension of calcium carbonate, calcium fluoride, calcium hydrate, ferro-manganese and sodium silicate and was applied in the same manner.

Other flux combinations may be employed consisting of combinations of, for example, calcium fluoride, potassium chromate, ferro-manganese, ferro-silicon with or without additions of titanium oxide, iron oxide and titanium hydride.

I have described the coating of a rod with metallic alloy powder by binding with adhesive materials, but I may simply mix the powdered alloys with the flux and apply them directly to the rod, by this means omitting any binder other than the flux.

Furthermore, I can employ ferro chromium and metallic nickel in the example mentioned above although I prefer using a hydride alloy.

One of the advantages of a welding rod in accordance with my invention is that during welding a steady arc is developed between the iron or steel core and the work, which is not the case if the welding rod itself is of stainless steel. The reason for this is that a stainless steel rod has a conductivity and oxide forming characteristics which give an interrupted arc resulting in non-continuous welds and non-continuous operation, whereas an iron or steel rod coated with the powdered alloy does not possess these disadvantages. An increase in the chromium content of an ordinary welding rod increases the above difficulties and with a rod having 25% chromium and 20 nickel the interruptions of the arc, and associated effects, are so serious as to make welding most difficult and the welds obtained are very unreliable. However, an iron or steel rod coated with a powdered alloy of chromium and nickel in the proper proportions to give the above percentages in the finished weld, gives a continuous arc and produces an entirely satisfactory weld.

While I have described several embodiments of my invention it is to be understood that this has been done for the purpose of illustration only. For instance, while I have determined that fluxes having the above stated compositions are satisfactory, it is obvious that other fluxes suitable for welding stainless steel may be employed. The scope of my invention is not to be limited by the examples given by way of illustration, but is to be determined from the appended claims.

What is claimed:

1. A welding rod for welding stainless iron and steel, including an iron core, and a coating of chromium in powdered form carried by a binder, the proportions of iron and chromium in said rod being approximately the same as in the stainless steel to be welded, said chromium having hydrogen adsorbed therein.

2. A welding rod for welding stainless iron and steel, including an iron core, and a coating of an alloy of nickel-chromium in powdered form carried by a binder, the proportions of iron, nickel and chromium in said rod being approximately the same as in the stainless steel to be welded, said alloy having hydrogen adsorbed therein.

3. A welding rod for welding stainless iron and steel, including an iron core, and a coating of an alloy in powdered form carried by a binder, said alloy including nickel, chromium and a metallic hydride, the proportions of iron, nickel and chromium in said rod being approximately the same as in the stainless steel to be welded.

4. A welding rod for welding stainless iron and steel, including an iron core, and a coating of chromium and titanium hydride in powdered form carried by a binder, the proportions of iron and chromium in said rod being approximately the same as in the stainless steel to be welded.

5. A welding rod for welding stainless iron and steel, including an iron core, and a coating of an alloy in powdered form carried by a binder, said alloy including nickel, chromium and titanium hydride, the proportions of iron, nickel and chromium in said rod being approximately the same as in the stainless steel to be welded.

6. A welding rod for welding stainless iron and steel, including an iron core, and a coating of an alloy in powdered form carried by a binder, said alloy including chromium and nickel in the ratio of approximately 70 to 30 by weight and 2% titanium hydride.

7. A welding rod for welding stainless iron or steel including a solid integral member made of iron, and nickel-chromium alloy in powdered form carried by said solid member, said alloy having hydrogen adsorbed therein, the proportions of iron, nickel and chromium in said rod being approximately the same as in the stainless steel to be welded.

8. A welding rod for welding stainless iron or steel including a solid integral iron member, and an alloy in powdered form carried by said iron member, said alloy including chromium and nickel in substantially the same percentages as in the stainless steel to be welded, and approximately 2% by weight of titanium hydride, the proportions of iron, nickel and chromium in said rod being approximately the same as in the stainless steel to be welded.

NILS K. G. THOLAND.